(12) United States Patent
Marotta et al.

(10) Patent No.: US 12,297,782 B2
(45) Date of Patent: May 13, 2025

(54) DETECTING CONDITION OF A SHAFT OF A GAS TURBOFAN AIRCRAFT ENGINE

(71) Applicant: Hamilton Sundstrand Corporation, Charlotte, NC (US)

(72) Inventors: Edward John Marotta, Longmeadow, MA (US); Geoffrey T. Blackwell, Vernon, CT (US); James A. Gosse, Storrs, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 234 days.

(21) Appl. No.: 17/214,295

(22) Filed: Mar. 26, 2021

(65) Prior Publication Data

US 2021/0332765 A1    Oct. 28, 2021

Related U.S. Application Data

(60) Provisional application No. 63/016,016, filed on Apr. 27, 2020.

(51) Int. Cl.
*F02C 9/46* (2006.01)
*F01D 21/00* (2006.01)
*F01D 21/14* (2006.01)

(52) U.S. Cl.
CPC .............. *F02C 9/46* (2013.01); *F01D 21/003* (2013.01); *F01D 21/14* (2013.01);
(Continued)

(58) Field of Classification Search
None
See application file for complete search history.

(56) References Cited

U.S. PATENT DOCUMENTS 4,833,405 A      5/1989   Richards et al.
5,293,774 A  *   3/1994   Ratherham ........... F01D 21/045
                                                73/112.05
(Continued)

FOREIGN PATENT DOCUMENTS

EP          3287609 A1    2/2018
EP          3287629 B1    5/2019
(Continued)

OTHER PUBLICATIONS

World Meteorological Organization "Electromagnetic Methods Of Lightning Detection" (Year: 2018).*
(Continued)

*Primary Examiner* — Arun Goyal
*Assistant Examiner* — William L Breazeal
(74) *Attorney, Agent, or Firm* — Kinney & Lange, P.A.

(57) ABSTRACT

Apparatus and associated methods are disclosed that relate to detecting a shaft condition of a gas turbofan engine. Shaft condition is detected based on sensed rotation rates of the shaft at different shaft locations. If the sensed rotations rates of the shaft at the two different shaft locations are indicative of a compromised shaft, such as, for example, a shaft that has sheared, then a fuel cut-off signal is generated. The fuel cut-off signal is then sent to a fuel cut-off valve so as to cut off the fuel supplied to the gas turbofan engine. In some embodiments, shaft condition is determined based on a difference between scaled rotation rates of the shaft at two different shaft locations.

19 Claims, 3 Drawing Sheets

(52) U.S. Cl.
CPC .... *F05D 2220/323* (2013.01); *F05D 2260/80* (2013.01); *F05D 2270/09* (2013.01); *F05D 2270/304* (2013.01)

(56) References Cited

U.S. PATENT DOCUMENTS

| | | | |
|---|---|---|---|
| 5,622,045 | A | 4/1997 | Weimer |
| 10,180,078 | B2 | 1/2019 | Roach et al. |
| 10,228,305 | B2 | 3/2019 | Shenouda |
| 10,316,689 | B2 | 6/2019 | Fletcher |
| 10,436,060 | B2 | 10/2019 | Dubreuil et al. |
| 10,551,253 | B2 | 2/2020 | Coughlan |
| 2013/0098042 | A1* | 4/2013 | Frealle ............... F02C 3/10 60/734 |
| 2013/0312423 | A1* | 11/2013 | Bacic ............... F01D 21/045 60/779 |

FOREIGN PATENT DOCUMENTS

| | | |
|---|---|---|
| EP | 3798425 A1 | 3/2021 |
| GB | 2488805 A | 9/2012 |

OTHER PUBLICATIONS

Extended European Search Report dated Sep. 22, 2021, received for corresponding European Application No. 21170721.1, seven pages.
Communication Pursuant to Article 94(3) EPC, dated Sep. 22, 2023, for corresponding European Application No. 21170721.1.

* cited by examiner

DETECTING CONDITION OF A SHAFT OF A GAS TURBOFAN AIRCRAFT ENGINE

BACKGROUND

Although it is rare, a shaft of a gas turbofan engine can fail. Various causes of such shaft failure can arise. For example, a shaft can break due to wear, fatigue, manufacturing defect, or a gear transmission failure for a multiple shaft engine. For military aircrafts, shafts can also break due to ballistic damage. If the shaft does break, the turbine blades can rapidly accelerate, because the load (e.g., the compressor, the fan, etc.) of the turbine is severed from the turbine. As the turbine blades accelerate, the centrifugal forces thereon increase. This increased centrifugal force can result in breakage and liberation of turbine blades from the turbine disk, projecting these broken blades outward from the shaft. These blade projectiles can cause catastrophic damage to the aircraft and can seriously harm people.

If aircraft fuel is shut off immediately following such a shaft failure, the rotational speed of the turbine blades can be controlled so as to prevent breakage and liberation of the turbine blades. Shutting off the fuel to a non-compromised gas turbofan aircraft engine, however, has its own deleterious consequences. Such an engine shutdown can compromise take-offs, landings, as well as level-flight operations. Due to these deleterious consequences, great care should be taken so as to ensure that shut off aircraft fuel is only in response to actual shaft compromise. Thus, both accurate and quick determination of shaft condition of a gas turbofan aircraft engine, would be desirable.

SUMMARY

Apparatus and associated methods described herein relate to a system for detecting condition of a shaft of a gas turbofan engine. The system includes a first rotation sensor mounted within the gas turbofan engine. The first rotation sensor is configured to sense rotation of a first member mechanically coupled to the shaft and to generate a first signal indicative of rotation frequency of the first member. The system includes a second rotation sensor mounted within the gas turbofan engine. The second rotation sensor is configured to sense rotation of a second member mechanically coupled to the shaft and to generate a second signal indicative of rotation frequency of the second member. The system includes a shaft-condition analyzer in electrical communication with the first and second rotation sensors. The shaft-condition analyzer is configured to determine a condition of the shaft of the gas turbofan engine based on the first and second signals. The system also includes a fuel cut-off controller in electrical communication with the shaft-condition analyzer, the fuel cut-off controller configured to generate a fuel cut-off signal in response to a compromised condition of the shaft determined by the shaft-condition analyzer.

Some embodiments relate to a method for detecting condition of a shaft of a gas turbofan engine. The method includes sensing, via a first rotation sensor mounted within the gas turbofan engine, rotation of a first member mechanically coupled to the shaft and to generate a first signal indicative of rotation frequency of the first member. The method includes sensing, via a second rotation sensor mounted within the gas turbofan engine, rotation of a second member mechanically coupled to the shaft and to generate a second signal indicative of rotation frequency of the second member. The method includes determining, via a shaft-condition analyzer in electrical communication with the first and second rotation sensors, a condition of the shaft of the gas turbofan engine based on the first and second signals. The method also includes generating, via a fuel cut-off controller in electrical communication with the shaft-condition analyzer, a fuel cut-off signal in response to a compromised condition of the shaft determined by the shaft-condition analyzer.

DETAILED DESCRIPTION

Apparatus and associated methods are related to detecting shaft condition of a gas turbofan engine. Shaft condition is detected based on sensed rotation rates of the shaft at different shaft locations. If the sensed rotations rates of the shaft at the two different shaft locations are indicative of a compromised shaft, such as, for example, a shaft that has sheared, then a fuel cut-off signal is generated. The fuel cut-off signal is then sent to a fuel cut-off valve so as to cut off the fuel supplied to the gas turbofan engine. In some embodiments, shaft condition is determined based on a difference between scaled rotation rates of the shaft at two different shaft locations.

Figure 1:
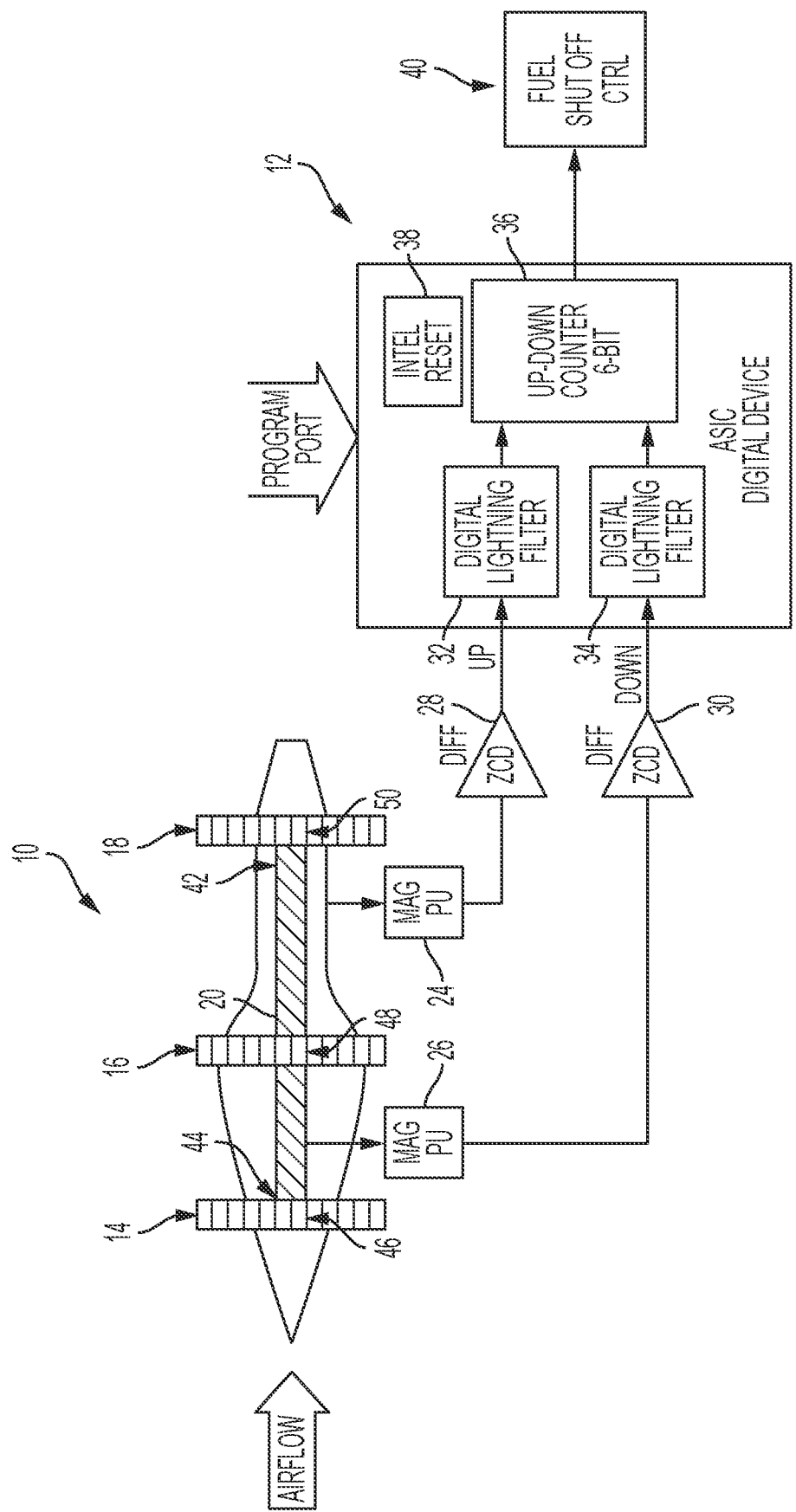
FIG. 1 is a schematic diagram of a shaft-condition detection system for a gas turbine engine.

FIG. 1 is a schematic diagram of a shaft-condition detection system for a gas turbine engine. In FIG. 1, gas turbine engine 10 is equipped with shaft condition detection system 12. Gas turbine engine 10 also includes fan 14, compressor 16, turbine 18, shaft 20. Various gas turbine engines, such as gas turbine engine 10, can be equipped with various types of shafts, such as shaft 20. For example, various gas turbine engines have shafts with single shaft members, twin shaft members, multiple shaft members, etc. These shafts with twin or multiple shaft members can have transmissions connecting the different shaft members to one another. The transmissions of these multiple-shaft-member shafts couple the shaft members to one another so that each of the multiple shaft members rotates at a rate that is proportion to the rate(s) of the other shaft member(s). The condition of the multiple-shaft-members shaft includes the condition of the transmission(s) connecting the multiple shaft members.

Shaft condition detection system 12, includes first and second rotation sensors 24 and 26, first and second zero-crossing detectors 28 and 30, first and second digital lightning filters 32 and 34, up/down counter 36, counter reset circuit 38, and fuel cut-off controller 40. Shaft condition detection system 12 is configured to control a fuel shut-off valve based on signals sensed by first and second rotation sensors 24 and 26. First and second shaft rotation sensors 24 and 26 are configured to sense rotation of shaft 20 at first and second shaft locations 42 and 44, respectively. Shaft locations 42 and 44 can be selected as locations on either side of potential shearing locations of shaft 20. In some embodiments, location 42 can be proximate turbine 18, as shown in FIG. 1, of gas turbofan engine 10. Location 44 can be proximate fan 14, as shown in FIG. 1, or proximate compressor 16 of gas turbofan engine 10.

Shaft rotation sensors 24 and 26 can sense such rotation of shaft 20 either directly or indirectly. For example, in some embodiments, shaft 20 can be equipped with optically detectable, electrically detectable, or magnetically detectable features or members for direct sensing of shaft rotation. In other embodiments, shaft rotation can be indirectly sensed. For example, rotation of fan 14, compressor 16, or turbine 18 can be sensed as indirect indications of rotation of shaft 20 at locations 46, 48, or 50, where fan 14, compressor 16, or turbine 18 is coupled thereto, respectively. Other such members mechanically coupled to shaft 20 also can be used for such indirect sensing of shaft rotation. In the embodiment depicted in FIG. 1, however, first and second shaft rotation sensors 24 and 26 generate signals (e.g., an electrical and/or optical signals) indicative of shaft rotation sensed at locations 42 and 44, respectively. In some embodiments, first and second shaft rotation sensors 24 and 26 generate analog periodic signals, having periods that are indicative of rotation rates of shaft 20 at first and second shaft locations 42 and 44, respectively.

First and second zero-crossing detectors 28 and 30 are in communication with first and second rotation sensors 24 and 26, respectively. First and second zero-crossing detectors 28 and 30 can be configured to perform various operations on the signals received from first and second rotation sensors 24 and 26. In an exemplary embodiment, first and second zero-crossing detectors 28 and 30 can be configured to covert analog periodic signal as generated by first and second rotation sensors 24 and 26 into digital periodic signals. For example, first and second zero-crossing detectors 28 and 30 can generate a digital signal indicative of a polarity of the analog signals received from first and second rotation sensors with a threshold value (e.g., a zero-crossing threshold).

In some embodiments, each of first and second zero-crossing detectors 28 and 30 can include a difference amplifier and a low-pass filter for reducing noise of the analog periodic signal received from first and second rotation sensors 24 and 26. Reducing such noise can reduce or prevent spurious digital signals generated by such noise. In some embodiments, first and second zero-crossing detectors 28 and 30 can generate signals indicative of an average level (e.g., an average voltage or current level) of the analog periodic signals generated by first and second rotation sensors 24 and 26. The analog periodic signals generated by first and second rotation sensors 24 and 26 can then be compared with these signals indicative of average levels, such as, for example, as inputs to a difference amplifier or a comparator. In other embodiments, the analog periodic signals generated by first and second rotation sensors 24 and 26 can then be compared with a predetermined threshold level. The outputs of first and second zero-crossing detectors 28 and 30 or comparator can provide digital periodic signals corresponding to the analog periodic signals received from first and second rotation sensors 24 and 26.

First and second digital lightning filters 32 and 34 are in communication with first and second zero-crossing detectors 28 and 30, respectively. First and second digital lightning filters 32 and 24 are configured to prevent, attenuate, or block frequency components of the signals received from second zero-crossing detectors 28 and 30. These blocked or attenuated frequencies are those that are typically generated when an electrical cable is exposed to a lightning strike. In some embodiments, such block frequencies are those above 30 kHz, 50 kHz, 75 kHz, or 100 kHz, for example. The outputs of first and second digital lightning filter 32 and 34 is a digital periodic signal indicative of rotation of shaft 20 at locations 42 and 44, respectively, with any spurious signals induced by lightning strike removed, blocked or attenuated.

Up/down counter 36 is in communication with first and second lightning filters 32 and 34. First lightning filter 32 is configured to provide a digital periodic signal to an increment terminal of up/down counter 36, and second lightning filter 34 is configured to provide a digital periodic signal to a decrement terminal of up/down counter 36. Up/down counter 36 then increments a count total in response to each rising edge of the digital periodic signal received at the increment terminal and decrements the count total in response to each rising edge of the digital periodic signal received at the decrement terminal. In the embodiment depicted in FIG. 1, the count total is incremented in response to pulses of the periodic digital signal having a pulse rate indicative of the rotation rate of turbine 18 of gas turbofan engine 10. Conversely, the count total is decremented in response to pulses of the periodic digital signal having a pulse rate indicative of the rotation rate of fan 14 of gas turbofan engine 10. For a unitary shaft, such as shaft 20 depicted in FIG. 1, these two pulse rates should be substantially equal to one another for a non-compromised shaft condition. Thus, the substantially equal increment and decrement rates should cause up/down counter 36 to generate a count total of approximately zero.

Shafts, such as shaft 20, can experience some level of torsion when the turbine 18 provides torque thereto, but such torsion should remain below some design threshold level, which can correspond to a count-total threshold. For a unitary shaft, such as shaft 20 depicted in FIG. 1, each increment of the count total should be followed (or led) by a decrement of the count total. Thus, for a non-compromised shaft, the count total should never get too high (or too low) in magnitude. Should the count total increase above such a count-total threshold, such a count total can indicate that shaft 20 is rotating at location 42 at a higher rate of rotation that shaft 20 is rotating at location 44. Such a difference in shaft rotation rates at locations 42 and 44 can be indicative of shearing (or at least gross deformation) of shaft 20. Up/down counter 36 generates an output signal indicative of the count total generated in response to the signals received at the increment and decrement terminals of up/down counter 36.

In some embodiments, up/down counter 36 can generate a count total that drifts over time. For example, noise on the increment and/or decrement terminals of up/down counter 36 can generate spurious counts which can then be reflected in the count total. These spurious counts can accumulate over time and could potentially result in an erroneous determination of a compromised shaft condition of shaft 20. To reduce the chance of such erroneous determinations of compromised shaft conditions, counter reset circuit 38 monitors the count total so as to determine counter drift. In response to a determination of counter drift, counter reset circuit 38 resets up/down counter 36. Counter reset circuit 38 is in communication with up/down counter 36 so as to receive a signal indicative of the count total. Counter drift can be determined in various manners. For example, in some embodiments, counter reset circuit can determine counter drift in response to a count total having a systemic offset value that is in excess of a threshold offset. Counter reset circuit 38 can then reset up/down counter 36 to a count total of zero in response to a determination that the count total has such a systematic offset. The systematic offset can be determined, for example, if the count total is non-zero but less than the threshold value and is stable (e.g., within a delta count threshold) for a time period greater than a threshold time.

Fuel cut-off controller 40 is in communication with up/down counter 36 so as to receive a signal therefrom indicative of the count total. Fuel cut-off controller 40 then generates a fuel cut-off signal in response to the count total exceeding the count-total threshold. Fuel cut-off controller 40 can include a latch so as to latch the fuel cut-off signal generated in response to the count total exceeding the count-total threshold. Because the fuel cut-off signal has been latched, fuel provision to gas turbofan engine 10 will not be resumed after the rotation frequency turbine 18 has slowed or stopped altogether. The count-total threshold can be set such that a compromised shaft condition can be quickly determined. For example, the threshold total can be set to a few counts above a maximum count total expected under extreme conditions (e.g., such as rapid acceleration conditions, a noisy environment, etc.). Such a threshold count can be expected to be generated very rapidly (e.g., within 1, 2, 3, 5, or 10 turbine shaft rotations) following a shearing event, for example.

Figure 2:
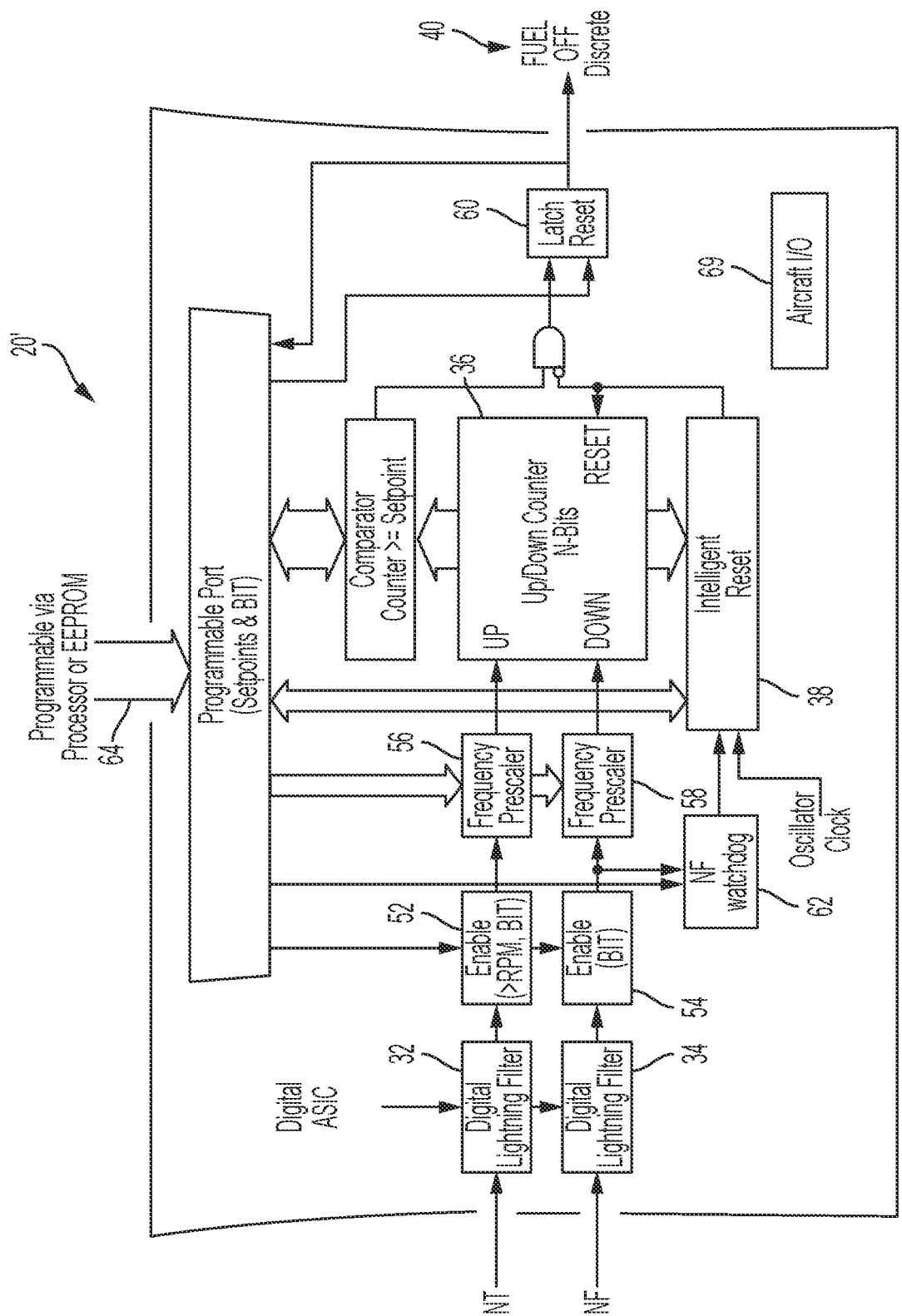
FIG. 2 is a block diagram of a shaft-condition detection system for a gas turbine engine.

FIG. 2 is a block diagram of a shaft-condition detection system for a gas turbine engine. In FIG. 2, shaft-condition detection system 20' includes digital first and second digital lightning filters 32 and 34, first and second channel enable buffers 52 and 54, first and second frequency pre-scalars 56 and 58, up/down counter 36, counter reset circuit 38, fuel cut-off controller 40, fuel cut-off latch 60, channel watchdog 62, and system controller 64. Shaft-condition detection system 20' has input ports NT and NF configured to receive signals indicative of shaft rotation at turbine and fan locations, respectively. Shaft-condition detection system 20' has system communication port Aircraft I/O 69 for facilitating communication between shaft-condition detection system 20' and an aircraft of gas turbofan engine 10, via an aircraft communications bus. Shaft-condition detection system 20' also has an output port that facilitates communication between shaft-condition detection system 20' and a fuel cut-off valve.

As shown in FIG. 2, the shaft condition detection system can support built-in testing. First and second channel enable buffers 52 and 54 can be configured to perform various operations. For example, in one embodiment, first and/or second channel enable buffers 52 and 54 can be configured to enable or disable transmission of the signal provide thereto by first and/or second digital lightning filter 32 and 34. If only one channel (i.e., one of the NT and NF channels) is enabled, then the count total generated by up/down counter 36 will rapidly increase or decrease in response to a mismatch in a number of pulses transmitted to the increment and decrement terminals of up/down counter 36. In another embodiment, first and/or second channel enable buffers 52 and 54 can be configured to enable or replace the transmission of the signal from the NT or NF channels with a test signal/signals. System controller 64 can determine operability of shaft-condition detection system 20' based on the signals generated in response to such test conditions by shaft-condition detection system 20'. During such a built in test mode, system controller 64 can prevent latching of a test condition that would otherwise cause shaft-condition detection system 20' to shut off fuel to gas turbofan engine 10 due to system response to the test conditions. System controller 64 can also perform a test of operability of shaft-condition detections system in response to an engine command (e.g., in response to a pilot shutting down or starting up an engine). Results of such a test of operability can be stored and/or reported and used to ensure operability of system 20' before a next engine command is issued, for example. Furthermore, operating the shut off mechanism in such a fashion would provide regular opportunities to exercise some of the elements of shaft-condition detection system 20'.

First and second frequency pre-scalars 56 and 58 can be configured to scale the digital periodic signals of the NT and NF channels such that the scaled signals can be compared to one another. For example, if shaft-condition detection system 20' is configured to determine a transmission condition for a shaft having multiple shaft members, the rotation rates of different shaft members can be different, even when the shaft condition is not compromised. The raw digital pulse rates that are to be compared may be related to one another by a rational relationship $n_{NT}:n_{NF}$ (e.g., 2:1, 3:1, 5:2, etc.). Such a rational relationship can be used to scale the pulse rates of the two channels NT and NF. For example, for every $n_{NF}$ pulses of the NF channel, a single pulse can be generated on output of first frequency pre-scalar 56. Similarly, for every $n_{NT}$ pulses of the NT channel, a single pulse can be generated on output of first frequency pre-scalar 58. By such frequency scaling, up/down counter will maintain a count total of approximately zero for a multiple member shaft having a non-compromised shaft condition. Similarly, if indirect measurements of shaft rates are performed, such as by counting fan blades, etc., frequency scaling can normalize the digital periodic signals indicative of the rotation rate at the different locations.

Shaft-condition detection system 20' also has channel watchdog 62, which is configured to monitor the signal provided on the NF channel. Channel watchdog 62 can be configured to inhibit the generation of a fuel cut-off signal if the rotation sensor, such as second rotation sensor 26 depicted in FIG. 1, corresponding to the NF channel fails. For example, channel watchdog 62 can inhibit the generation of a fuel cut-off signal in response to an NF channel signal that indicates zero rotation. In one embodiment, channel watchdog 62 generates a keep-alive signal in response to pulses detected on the NF channel. A timer will count a number of system clock cycles between each received keep-alive signal. If the number of system clock cycles counted exceeds a threshold total count (e.g., indicating a low rotation rate), then counter reset circuit 38 will inhibit the generation of a fuel cut-off signal. No channel watchdog, such as channel watchdog 62, is required for monitoring the NT channel, though. If the turbine rotation sensor were to fail, the up/down counter would simply count down—the opposite direction for generation of a fuel cut-off signal. Therefore, shaft-condition detection system 20', as depicted in FIG. 2, can be immune from generation of false fuel cut-off signals based on failure of the turbine rotation sensor.

Figure 3:
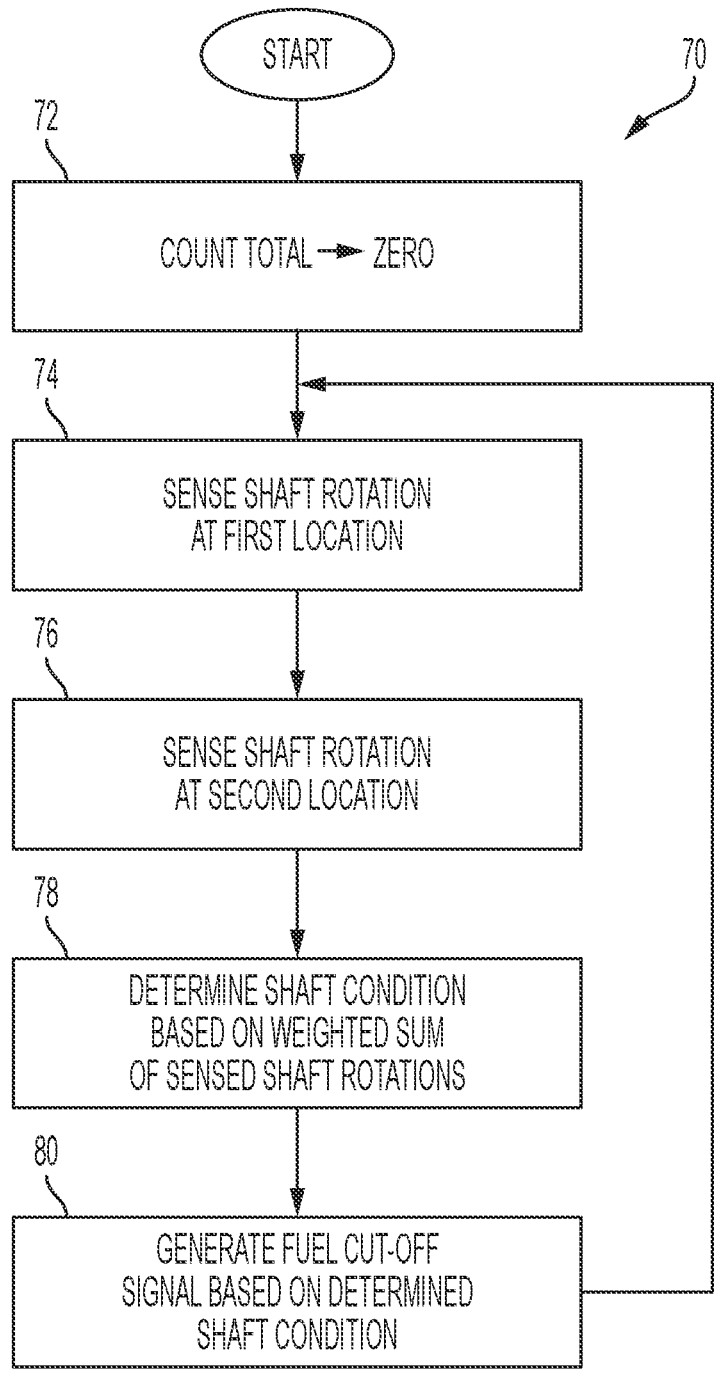
FIG. 3 is a flow chart of a method for detecting condition of a shaft of a gas turbofan engine.

FIG. 3 is a flow chart of a method for detecting condition of a shaft of a gas turbofan engine. In FIG. 3, method 70 begins at step 72 where a count total is zeroed. Then, method 70 proceeds to step 74 where rotation of a shaft is sensed at a first location along the shaft. At step 76, rotation of the shaft is sensed at a second location along the shaft. Then at step 78, shaft condition of the shaft is determined based on a weighted sum of the signals generated by the sensors sensing rotation of the shaft at first and second locations along the shaft. Then at step 80, a fuel cut-off signal is generated in response to the shaft condition determined at step 78. After step 80, method 70 returns to step 74, where rotation of an shaft is again sensed at a first location along the shaft.

Other methods could be performed to determine shaft condition of a shaft of a gas turbofan engine. For example, a rotation sensor can be configured to sense rotation of the turbine of the engine. The rotation of the turbine would increase rapidly in response to shearing of the shaft, for example. If the rotation increased at a predetermined rate of acceleration, a determination of shaft shearing could be made. Such a method, however, involves determining a rate of acceleration, which can be a very noise inducing calculation. Because such a calculation is inherently noisy, false determination of shaft shearing are possible. Method 70 incurs no such risk. Instead of determining an acceleration rate, method 70 simply determines shaft condition based on first and second rotation rates at distinct locations along the shaft of the engine.

DISCUSSION OF POSSIBLE EMBODIMENTS

The following are non-exclusive descriptions of possible embodiments of the present invention.

Apparatus and associated methods relate to a system for detecting condition of a shaft of a gas turbofan engine. The system includes a first rotation sensor mounted within the gas turbofan engine. The first rotation sensor is configured to sense rotation of a first member mechanically coupled to the shaft and to generate a first signal indicative of rotation frequency of the first member. The system includes a second rotation sensor mounted within the gas turbofan engine. The second rotation sensor is configured to sense rotation of a second member mechanically coupled to the shaft and to generate a second signal indicative of rotation frequency of the second member. The system includes a shaft-condition analyzer in electrical communication with the first and second rotation sensors. The shaft-condition analyzer is configured to determine a condition of the shaft of the gas turbofan engine based on the first and second signals. The system also includes a fuel cut-off controller in electrical communication with the shaft-condition analyzer, the fuel cut-off controller configured to generate a fuel cut-off signal in response to a compromised condition of the shaft determined by the shaft-condition analyzer.

The system of the preceding paragraph can optionally include, additionally and/or alternatively, any one or more of the following features, configurations and/or additional components:

A further embodiment of the foregoing system, wherein the first member is a turbine of the gas turbofan ending and the second member is a compressor of the gas turbofan engine wherein the first member is a turbine of the gas turbofan ending and the second member is a compressor of the gas turbofan engine.

A further embodiment of any of the foregoing systems, wherein the first signal can be a periodic digital signal having a frequency indicative of the rotation frequency of the first member, and the second signal can a periodic digital signal having a frequency indicative of the rotation frequency of the second member.

A further embodiment of any of the foregoing systems can further include first and second lightning filters configured to reject lightning-behavior frequencies of the first and second signals, respectively, wherein the lightning-behavior frequencies comprise frequencies typical of electrical cable exposures to lightning strike.

A further embodiment of any of the foregoing systems, wherein the shaft-condition analyzer can further include a first frequency prescalar configured to generated a first scaled signal indicative of scaled rotation frequency of the first member. The shaft-condition analyzer can further include a second frequency prescalar configured to generated a second scaled signal indicative of scaled rotation frequency of the second member.

A further embodiment of any of the foregoing systems, wherein the shaft-condition analyzer can be configured to determine a non-compromised shaft condition in response a difference between the scaled rotation frequencies of the first member and second members being less than a threshold difference.

A further embodiment of any of the foregoing systems, wherein the compromised condition of the shaft determined by the shaft-condition analyzer can be determined in response to a difference between the scaled rotation frequencies of the first and second members being greater than a threshold difference.

A further embodiment of any of the foregoing systems, wherein the compromised condition is a sheared condition of a shaft.

A further embodiment of any of the foregoing systems, wherein the shaft-condition analyzer can include a shaft-rotation comparator configured to generate a signal indicative of a difference between the scaled rotation frequencies of the first and second members, based on the first and second scaled signals indicative of scaled rotation frequencies of the first and second members, respectively.

A further embodiment of any of the foregoing systems, wherein the shaft-rotation comparator can include an up/down counter configured to increment a count total for each cycle of the first signal and to decrement the count total for each cycle of the second signal.

A further embodiment of any of the foregoing systems, wherein the fuel cut-off controller generates the fuel cut-off signal in response to the count total exceeding a threshold total.

A further embodiment of any of the foregoing systems can further include a fuel cutoff valve in electrical communication with the fuel cut-off controller. The fuel cutoff valve can be configured to cut off fuel to the gas turbofan engine in response to receiving the fuel cut-off signal from the fuel cut-off controller.

A further embodiment of any of the foregoing systems can further include a speed probe failure circuit in electrical communication with the second rotation sensor. The speed probe failure circuit can be configured to determine if the second rotation sensor is faulty and to inhibit transmission of the fuel cut-off signal from the fuel cut-off controller in response to a determination that the second rotation sensor is faulty.

Some embodiments relate to a method for detecting condition of a shaft of a gas turbofan engine. The method includes sensing, via a first rotation sensor mounted within the gas turbofan engine, rotation of a first member mechanically coupled to the shaft and to generate a first signal indicative of rotation frequency of the first member. The method includes sensing, via a second rotation sensor mounted within the gas turbofan engine, rotation of a second member mechanically coupled to the shaft and to generate a second signal indicative of rotation frequency of the second member. The method includes determining, via a shaft-condition analyzer in electrical communication with the first and second rotation sensors, a condition of the shaft of the gas turbofan engine based on the first and second signals. The method also includes generating, via a fuel cut-off controller in electrical communication with the shaft-condition analyzer, a fuel cut-off signal in response to a compromised condition of the shaft determined by the shaft-condition analyzer.

The method of the preceding paragraph can optionally include, additionally and/or alternatively, any one or more of the following features, configurations and/or additional components:

A further embodiment of the foregoing method, wherein the first signal can be indicative of rotation frequency of a turbine of the gas turbofan engine and the second signal can be indicative of rotation frequency of a compressor of the gas turbofan engine.

A further embodiment of any of the foregoing methods, wherein the first signal can be a periodic digital signal having a frequency indicative of the rotation frequency of the first member, and the second signal can be a periodic digital signal having a frequency indicative of the rotation frequency of the second member.

A further embodiment of any of the foregoing methods can further include rejecting, via first and second lightning filters configured to reject lightning-behavior frequencies of the first and second signals, respectively, lightning-behavior frequencies being those that are typical of cable exposures to lightning strike.

A further embodiment of any of the foregoing methods can further include scaling, via first and second frequency prescalars, first and second scaled signals indicative of scaled rotation frequencies of the first and second members, respectively.

A further embodiment of any of the foregoing methods can further include determining, via the shaft-condition analyzer, a compromised shaft condition in response to a difference between the scaled rotation frequencies of the first and second members being greater than a threshold difference.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for detecting a condition of a shaft of a gas turbofan engine, the system comprising:
   a first rotation sensor mounted within the gas turbofan engine, the first rotation sensor configured to sense a rotation of a first member mechanically coupled to the shaft and to generate a first signal indicative of a rotation frequency of the first member;
   a second rotation sensor mounted within the gas turbofan engine, the second rotation sensor configured to sense a rotation of a second member mechanically coupled to the shaft and to generate a second signal indicative of a rotation frequency of the second member, wherein pulse rates of the first signal and the second signal are substantially equal to one another at all times;
   an up/down counter configured to increment a count total in response to each cycle of the first signal and to decrement the count total in response to each cycle of the second signal, wherein for an uncompromised shaft condition, each increment of the count total is followed (or led) by a decrement of the count total, thereby causing the up/down counter to generate the count total as approximately zero at all times;
   a shaft-condition analyzer in electrical communication with the first rotation sensor and the second rotation sensor, the shaft-condition analyzer configured to determine the condition of the shaft of the gas turbofan engine based on the count total, the count total indicative of torsion of the shaft, wherein an increase or a decrease in the count total corresponds to an associated increase or decrease, respectively, in the torsion of the shaft; and
   a fuel cut-off controller in electrical communication with the shaft-condition analyzer, the fuel cut-off controller configured to generate a fuel cut-off signal in response to the count total exceeding a minimum and/or a maximum threshold indicative of a design torsion threshold level, thereby indicating a compromised shaft condition.

2. The system of claim 1, wherein the first member is a turbine of the gas turbofan engine and the second member is a compressor of the gas turbofan engine.

3. The system of claim 1, wherein the first signal is a periodic digital signal having a frequency indicative of the rotation frequency of the first member, and wherein second signal is another periodic digital signal having a frequency indicative of the rotation frequency of the second member.

4. The system of claim 1, further comprising:
   a first lightning filter configured to reject lightning-behavior frequencies of the first signal; and
   a second lightning filter configured to reject lightning-behavior frequencies of the second signal,
   wherein the lightning-behavior frequencies comprise frequencies typical of electrical cable exposures to lightning strike.

5. The system of claim 1, wherein the shaft-condition analyzer comprises:
   a first prescalar configured to generate a first scaled signal indicative of scaled rotation frequencies of the first member; and
   a second prescalar configured to generate a second scaled signal indicative of scaled rotation frequencies of the second member.

6. The system of claim 5, wherein the shaft-condition analyzer is configured to determine the uncompromised shaft condition in response a difference between the scaled rotation frequencies of the first member and second member being less than a threshold difference.

7. The system of claim 5, wherein the compromised shaft condition determined by the shaft-condition analyzer is determined in response to a difference between the scaled rotation frequencies of the first member and second member being greater than a threshold difference.

8. The system of claim 7, wherein the compromised shaft condition is a sheared condition of a shaft.

9. The system of claim 5, wherein the shaft-condition analyzer comprises:
   a shaft-rotation comparator configured to generate a signal indicative of a difference between the scaled rotation frequencies of the first member and second member, based on the first scaled signal and second scaled signal being indicative of scaled rotation frequencies of the first member and second member, respectively.

10. The system of claim 1, wherein the fuel cut-off controller generates the fuel cut-off signal in response to the count total exceeding a threshold total.

11. The system of claim 1, further comprising:
a counter reset circuit in electrical communication with the up/down counter, the counter reset circuit configured to determine if the up/down counter has a systemic offset value and to reset the counter to zero in response to a determination that the up/down counter has a systemic offset.

12. The system of claim 11, wherein the counter reset circuit determines that the up/down counter has the systemic offset if the count total is non-zero but less than the threshold value and is stable for a period of time greater than a threshold time.

13. The system of claim 1, further comprising:
a fuel cutoff valve in electrical communication with the fuel cut-off controller, the fuel cutoff valve configured to cut off fuel to the gas turbofan engine in response to receiving the fuel cut-off signal from the fuel cut-off controller.

14. The system of claim 1, further comprising:
a speed probe failure circuit in electrical communication with the second rotation sensor, the speed probe failure circuit configured to determine if the second rotation sensor is faulty and to inhibit transmission of the fuel cut-off signal from the fuel cut-off controller in response to a determination that the second rotation sensor is faulty.

15. A method for detecting a condition of a shaft of a gas turbofan engine, the method comprising:
sensing, via a first rotation sensor mounted within the gas turbofan engine, a rotation of a first member mechanically coupled to the shaft and to generate a first signal indicative of a rotation frequency of the first member;
sensing, via a second rotation sensor mounted within the gas turbofan engine, a rotation of a second member mechanically coupled to the shaft and to generate a second signal indicative of a rotation frequency of the second member, wherein pulse rates of the first and second signals are substantially equal to one another at all times;
incrementing, via an up/down counter, a count total in response to each cycle of the first signal;
decrementing, via the up/down counter, the count total in response to each cycle of the second signal, wherein for an uncompromised shaft condition, each increment of the count total is followed (or led) by a decrement of the count total, thereby causing the up/down counter to generate the count total as approximately zero at all times;
determining, via a shaft-condition analyzer in electrical communication with the first rotation sensor and the second rotation sensor, the condition of the shaft of the gas turbofan engine based on the count total between the first signal and the second signal, the count total indicative of a torsion of the shaft, wherein an increase or a decrease in the count total corresponds to an associated increase or decrease, respectively, in the torsion of the shaft; and
generating, via a fuel cut-off controller in electrical communication with the shaft-condition analyzer, a fuel cut-off signal in response to the count total exceeding a minimum and/or a maximum threshold indicative of a design torsion threshold level, thereby indicating a compromised shaft condition.

16. The method of claim 15, wherein the first member is a turbine of the gas turbofan engine and the second member is a compressor of the gas turbofan engine.

17. The method of claim 15, wherein the first signal is a periodic digital signal having a frequency indicative of the rotation frequency of the first member, and wherein the second signal is another periodic digital signal having a frequency indicative of the rotation frequency of the second member.

18. The method of claim 15, further comprising:
rejecting, via a first lighting filter configured to reject lightning-behavior frequencies of the first signal;
rejecting, via a second lighting filter configured to reject lightning-behavior frequencies of the second signal,
wherein the lightning-behavior frequencies comprise frequencies typical of electrical cable exposures to lightning strike.

19. The method of claim 18, further comprising:
determining, via the shaft-condition analyzer, the compromised shaft condition in response to a difference between the scaled rotation frequencies of the first member and second member being greater than a threshold difference.

* * * * *